United States Patent [19]
Cherabuddi

[11] Patent Number: 5,944,810
[45] Date of Patent: Aug. 31, 1999

[54] SUPERSCALAR PROCESSOR FOR RETIRING MULTIPLE INSTRUCTIONS IN WORKING REGISTER FILE BY CHANGING THE STATUS BITS ASSOCIATED WITH EACH EXECUTION RESULT TO IDENTIFY VALID DATA

[75] Inventor: Rajasekhar Cherabuddi, Sunnyvale, Calif.

[73] Assignee: Sun Microsystems, Inc., Palo Alto, Calif.

[21] Appl. No.: 08/883,125

[22] Filed: Jun. 27, 1997

[51] Int. Cl.⁶ ........................................ G06F 9/38
[52] U.S. Cl. .............. 712/23; 712/28; 712/217; 712/218
[58] Field of Search ............... 395/800.01, 800.23, 395/800.28; 712/1, 23, 28, 217, 218

[56] References Cited

U.S. PATENT DOCUMENTS

| | | | |
|---|---|---|---|
| 5,499,352 | 3/1996 | Clift et al. ........................... | 712/217 |
| 5,613,132 | 3/1997 | Clift et al. ........................... | 712/217 |
| 5,627,985 | 5/1997 | Fetterman et al. .................. | 395/393 |
| 5,689,720 | 11/1997 | Nguyen et al. ....................... | 712/23 |
| 5,748,934 | 5/1998 | Lesartre et al. ..................... | 395/392 |
| 5,764,943 | 6/1998 | Wechsler ............................. | 395/394 |

*Primary Examiner*—Eric Coleman
*Assistant Examiner*—Mackly Monestime
*Attorney, Agent, or Firm*—Jones Volentine, LLP

[57] ABSTRACT

In a superscalar processor, multiple instructions are executed in parallel to obtain multiple execution results, and the multiple execution results are stored in a working register file. Each execution result in the working register file has at least one status bit associated therewith which identifies the execution result as valid data. The multiple execution results contained in the working register data then retired by changing the status bits associated with each execution result to identify the execution result as an architectural copy of the data. In this manner, the speculative data is retired without data movement of the speculative data, thus reducing a number of ports needed in the superscalar processor.

4 Claims, 6 Drawing Sheets

| Add r1 ◄──── r2, r3 | 0 |
| --- | --- |
| Add r8 ◄──── r6, r9 | 1 |
| Sub r4 ◄──── r18, r1 | 2 |
| Sub r11 ◄──── r5, r23 | 3 |

FIG. 2

SUPERSCALAR PROCESSOR FOR RETIRING MULTIPLE INSTRUCTIONS IN WORKING REGISTER FILE BY CHANGING THE STATUS BITS ASSOCIATED WITH EACH EXECUTION RESULT TO IDENTIFY VALID DATA

BACKGROUND OF THE INVENTION

1. Field of the Invention

The present invention generally relates to superscalar processors, and more particularly, to a apparatus exhibiting a reduced number of register file ports in a very wide instruction issue processor.

2. Description of the Related Art

To gain performance, current machine architectures have become aggressive in issuing and executing multiple instructions per clock. As explained in further detail below, this almost linearly increases the number of read and write ports to the architectural register file of the chip. Moreover, speculative execution is a common technique employed in implementing such machines, which in turn requires the provision of an additional reorder buffer register file. Thus, when instructions are issued in such machines to execution units, the number of ports are very high on both the architectural register file and the reorder buffer register file. This makes the register files heavily metal limited, resulting in the dual drawbacks of increasing the metal area and worsening the timing characteristics. Rapidly accessing the operand data is critical in most of these machines, and thus the register file timing becomes a performance bottleneck.

Referring to FIG. 1, the basic relationship between the number of register ports and the issue number of a machine will be described. FIG. 1 generally depicts the operation of a superscalar machine. Reference characters IF denote fetching an instruction (such as "add" r1 and r2 to obtain r3), and characters ID denote the fetching of data needed to carry out the instruction (such as r1 and r2). The instructions and data are loaded in a register file, whereby the data is applied to the appropriate one of parallel execution units (such as ALUs). In the case of two execution units running in parallel, the processor is said to have a superscalar degree of 2, or in other words, is a 2-issue machine. Four data (two for each issue) are simultaneously supplied from the register file to the execution units, and thus four read register ports would be needed. Similarly, in the case of a 4-issue machine, the register would be equipped with eight ports, whereas an 8-issue machine would require sixteen register read ports. Also, in some cases the execution units, such as store execution units, will require the provision of three ports.

In addition, due to dependencies among instructions and a lack of parallelism in the program code, reorder buffers as mentioned above are additionally provided, further increasing the port requirements. Assume, for example, the case of an 4-issue machine in which the four instructions shown in FIG. 2 have been fetched for execution. As can be seen, the third instruction "2" is dependent on the execution results of the first instruction "0". That is, the value of r1 needed for r4←r18, r1 will not be know until after execution of r1←r2, r3. Thus, if these four instructions were simultaneous applied to the machine's execution pipeline, erroneous calculations may result. Instruction dependencies such as this were one factor leading to the so-called "out of order" execution discussed below.

Reference is now made to FIG. 3 for a general explanation of an "out-of-order" machine. The out-of-order machine is capable of scanning the fetched instructions to identify those that are dependent and those that are independent. Consider the example of an 8-issue machine, and assume, as shown in FIG. 3, three sets of eight instructions each, for a total of 24 instructions under consideration. As also shown, assume the second and sixth instructions of the first set are dependent, and that there are no dependent instructions in either the second or third sets. These instructions are loaded into an issue window or instruction window of the machine. A scheduling algorithm identifies the independent instructions within the instruction window whose operands have been completed (and for which an execution module is available), and loads the first eight of the independent instructions in the instruction pipeline. These would be instructions 1, 3–5 and 7–10 in FIG. 3. Then, assuming that the operands for instructions 2 and 6 have been resolved, these instructions together with instructions 11–16 may be applied to the pipeline in a next execution cycle.

Conventionally, out-of-order execution for an 8-issue machine is implemented as shown in FIG. 4. Eight instructions are received in order. Each instruction is made up of an instruction identifier Iid, a logical destination address Lid and at least two operand identifiers scr. The logical destination addresses Lid identify which register of an architectural register file ARF 408 that a corresponding instruction result is to be deposited, and are stored in order in a dependency chain table DCT 402 at corresponding instruction identifier addresses Iid of the DCT 402.

As already mentioned, the instructions arrive eight at a time in an order dictated by the program code. These instructions are stored, in order, in eight of the one-hundred twenty-eight registers of the central instruction window CIW 404. By searching the destination addresses Did contained in the DCT 402, a scheduling algorithm identifies the dependent instructions within the CIW 404 whose operands have been not completed. Only the first eight independent entries are applied to a bypass matrix 410. The bypass matrix 410 receives the operand data from from multiple sources including, but not limited to, the ARF 408 and/or a reorder buffer ROB 406, and routes the data to the respectively appropriate execution units 412. The execution units 412, for example, are arithmetic logic units and the like.

The reorder buffer ROB 406 temporarily stores the results of the execution units 412, and for this reason, the ROB 406 is equipped with eight write ports. Each result is stored in the ROB 406 at an address which corresponds to the physical register identifier Rid, which is the transformed logical destination address Lid once it passes through the DCT 402. These results remain in the ROB 408 until they are "retired" to the architectural register file 408, at which time the data is stored at the appropriate logical destination address Lid within the ARF 408. In this example, the ARF 408 has 160 registers.

In the example, up to eight data at a time can be retired into the ARF 408 from the ROB 408, and thus the ROB 408 is equipped with eight read ports and the ARF is equipped with eight write ports. However, all eight data must satisfy the retirement criteria, and thus, in some cases less than eight data may be retired in a given cycle. In order for a data to be retired, all previous data must be present. In other words, there can be no retirement of the results of a given instruction into the ARF 408 until all prior instructions have been executed and stored.

In addition, the occurrence of a so-called "trap" results in the "flushing" of all subsequent data already stored in the ROB 406. Traps are internal errors or exceptions, such as divide-by-zero and arithmetic overflows. Keeping in mind that the instructions are executed out-of-order (relative to the program code), it is possible for a trap to occur after later-ordered instructions have been executed and the corresponding results stored in the ROB 406. A trap results in the deletion of all subsequent data of the ROB 406. In this way, the integrity of the data contained in the ARF 408 is assured.

The configuration of FIG. 4 also demands the provision of read ports from both of the ROB 406 and the ARF 408. This is because the possibility exists that some or even all of the data needed to execute the eight instructions is contained in one of the ROB 406 or the ARF 408. In the example here, eighteen read ports extend from the ROB 406 to the bypass matrix 406 and an additional eighteen read ports extend from the ARF 408 to the bypass matrix 406. The number of ports (eighteen in this example) is dictated by the execution units. In the example here, two of the execution units are "store" units which require three operands to execute. The remaining six execution units are supplied with two operands each. The total operands applied to the pipeline, and thus total read ports from ROB 406 and ARF 408 is (2×6)+(3×2)=18.

In the example of the 8-issue machine of FIG. 4, the number of ports equipped in the ROB 406 and the ARF 412 is as shown below:

TABLE 1

| PORT TYPE | ROB 410 | ARF 412 | TOTAL |
| --- | --- | --- | --- |
| READ (Execution) | 18 | 18 | 36 |
| WRITE (Execution) | 8 | | 8 |
| READ (Retire) | 8 | | 8 |
| WRITE (Retire) | | 8 | 8 |
| TOTALS | 34 | 26 | 60 |

Note also that there are 26 read ports on the ROB 406, which in particular constitutes a critical path of the machine. These numerous ports place a burden on system design and performance. As mentioned above, the register files are thereby heavily metal limited, resulting in an increase in the metal area and a worsening of the timing characteristics. Accessing the operand data is most critical in most of these machines, and thus the register file timing becomes a performance bottleneck. The enormous number of ports on the architectural and reorder buffer registers often stand in the way of meeting timing goals. Current architectures attempt to address this problem either at the cost of area or timing or loss in performance.

SUMMARY OF THE INVENTION

It is thus a general object of the present invention to overcome or at least minimized the various drawbacks of the conventional processor architecture discussed above.

It is a further object of the invention to provide a method for reducing the number of ports in a high-issue processor designed for out-of-order execution.

According to one aspect of the invention, a superscalar processor is provided which comprises: execution units for executing multiple instructions in parallel to obtain multiple execution results; a working register file for storing the multiple execution, each execution result in the working register file having at least one status bit associated therewith which identifies the execution result as valid data; and means for retiring the multiple execution results contained in the working register data by changing the status bits associated with each execution result to identify the execution result as architectural copy of data.

According to another aspect of the invention, the superscalar processor further comprises a first table identifying an address within the working register file of each speculative data, and a second table identifying an address within the working register file of each architectural copy of data.

According to yet another aspect of the invention, the superscalar processor futher comprises: a central instruction window for storing storing multiple instructions; means for scanning the first table to identify and extract from the working register file any operands of the multiple instructions which are stored as speculative data in the working register file; means for scanning the second table to identify and extract from the working register file any remaining operands of the multiple instructions which are not stored as speculative data in the working register file.

According to still another aspect of the invention, in a superscalar processor which executes processor instructions out-of-order such that execution results are first stored as speculative data prior to being retired to destination addresses as an architectural copy of data, an improvement comprises storing both the speculative data and the architectural copy of the data in a same working register file, and retiring the speculative data by changing status bits in the working register file, wherein the speculative data is retired as the architectural copy of the data without data movement of the speculative data.

BRIEF DESCRIPTION OF THE DRAWINGS

The above and other features and advantages of the present invention will become readily apparent from the description that follows, with reference to the accompanying drawings, in which:

FIG. 2 illustrates an example of eight instructions which have been fetched for execution and which contain a dependent instruction;

DETAILED DESCRIPTION OF THE PREFERRED EMBODIMENTS

In traditional architectures, as described above, the results after the instructions get executed are deposited into a reorder buffer, and upon retirement, the results are moved to the architectural register file. According to the present invention, a single register file, called a working register file herein, replaces the reorder buffer and the architectural register file of the traditional configuration. Also, in contrast to the ROB and ARF architectures, the present invention does not carry out a data movement at the time of retire. Rather, several status bits (which are not very expensive) are maintained with each working register file entry. At retire, only these status bits are updated. This saves multiple read ports and write ports otherwise needed in the traditional designs.

Figure 5:
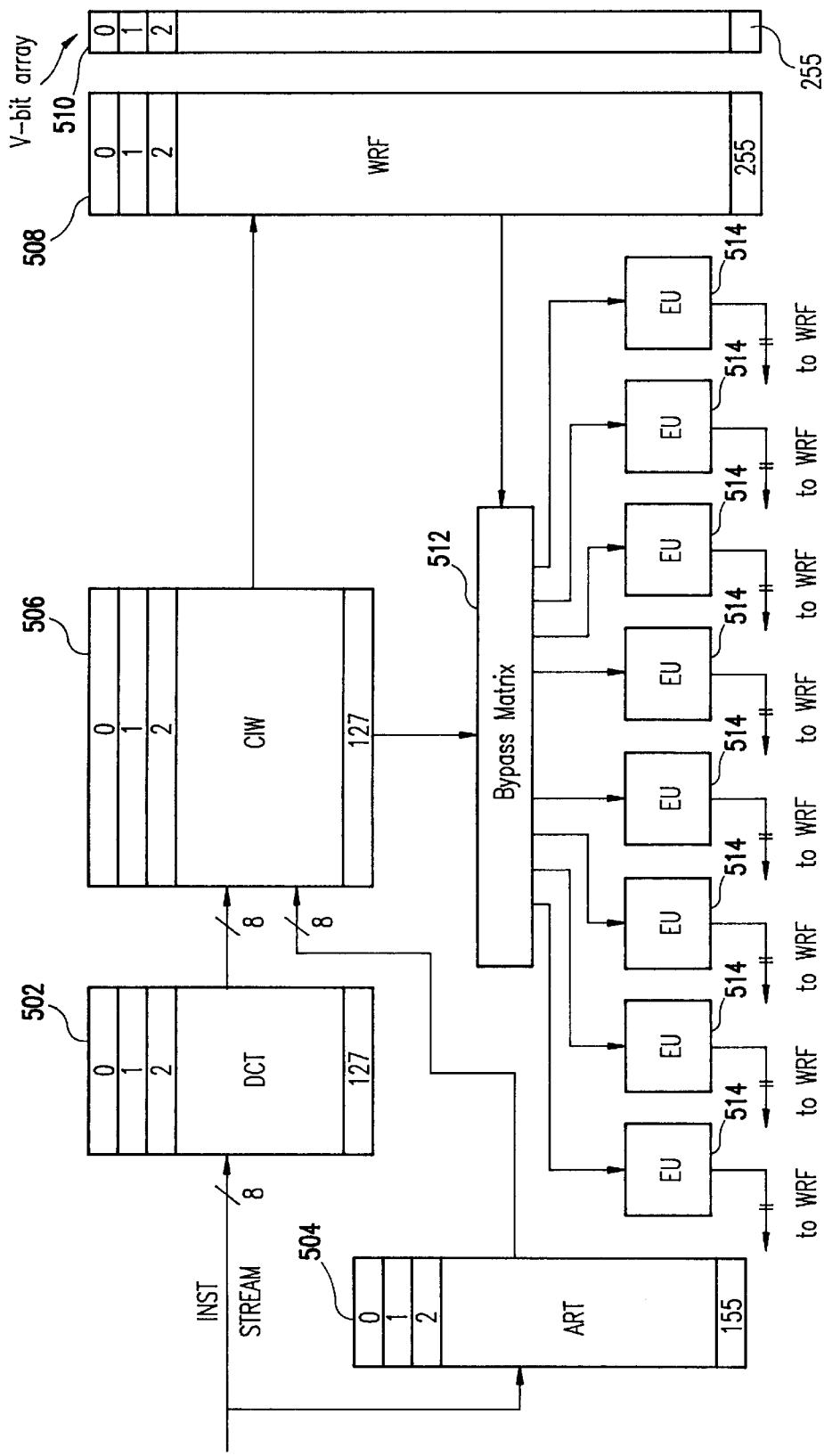
FIG. 5 shows an example of a machine architecture according to the present invention.

FIG. 5 is illustrative of an exemplary implementation of an 8-issue machine according to the present invention. The exemplary architecture includes a dependency chain table DCT 502 and an architectural register table (ART) 504. The DCT 502 contains a logical register identifier field Lid and a physical register identifier field Rid, whereas the ART 504 contains a physical register field Rid. The architecture is further equipped with a central instruction window CIW 506, and a working register file WRF 508. The WRF 508 has a valid-bit array 510 associated therewith. The valid-bit array 510 is set when the instruction gets deposited in the CIW 506 and is reset on instruction "retirement" of data, to thereby avoid data movement. Instructions and data are applied to a bypass matrix 512 from the CIW 506 and the WRF 508, respectively. The bypass matrix routes the data (operands) to the appropriate one of parallel execution units 514.

Figure 6:
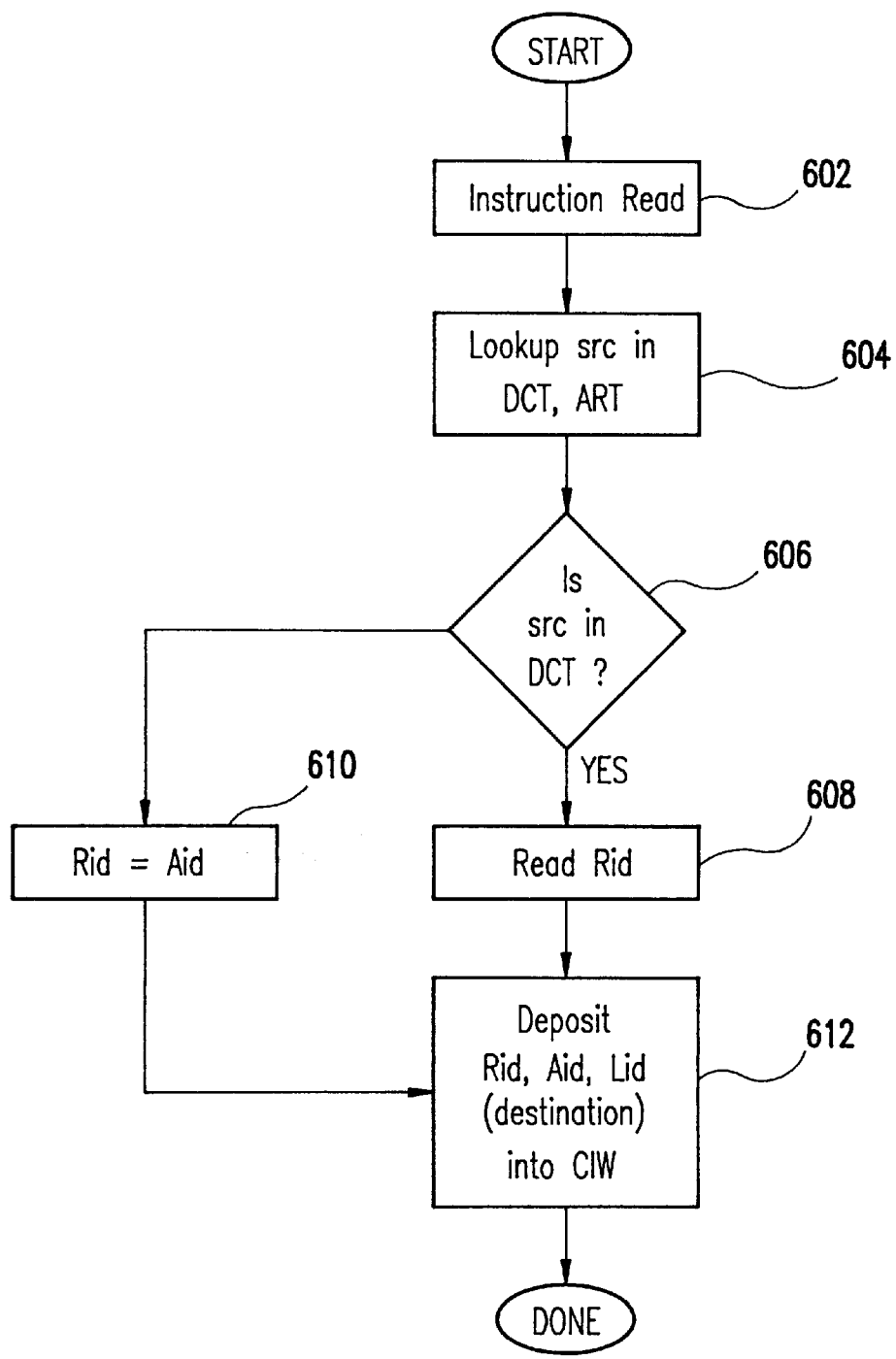
FIG. 6 shows an example of an operational flowchart describing the operation of the present invention.

The operation of the configuration shown in FIG. 5 will now be described with reference to the flowchart of FIG. 6.

Initially, at step 602, an instruction from the fetch unit is read, and in particular, the operand data address src of each instruction is identified. The DCT 502 and the ART 504 are scanned at step 604 to lookup the src of the read instruction. In the case where the src is found in the DCT 502 (YES at step 606), the physical register identifier Rid is read from the DCT 502 at step 608. In other words, the corresponding operand data has not yet been retired, and thus speculative data is to be extracted from the WRF 508. In the case where the src is not found in the DCT 502 (NO at step 606), the Rid from the ART 504 is read as the architectural register pointer Aid at step 610. In other words, the operand data has been retired in this case as indicated by the v-bit of the v-bit array 510. Then, at step 612, the Rid, Aid and Lid are deposited into the CIW 506 for execution of the corresponding instruction.

At the time of retirement, the instructions aid, lid, rid and iid are read from the CIW 506 and used as described here. (It should be noted that iid is not deposited for any instruction when written to CIW, but is the index to CIW itself.) The iid is used to invalidate the CIW entry and DCT entry of this instruction. The WRF is indexed with aid and its corresponding valid bit is set to zero, indicating this entry no longer has the latest architectural copy of the data for this register. This can be added now to the pool of renamed register space. The ART is indexed with the lid and the entry value is overwritten to the rid value that is stored in the CIW for this instruction. This indicates that now the latest architectural value of this logical register is at this location in the WRF. The retirement algorithm involves four steps which may be summarized as follows:

| | |
|---|---|
| ciw(iid). v=0 | // ciw is indexed with iid and v bit set to 0 |
| dct(iid). v=0 | //dct is indexed with iid and v bit set to 0 |
| wrf(aid). v=0 | // wrf v bit updated |
| art(lid) = rid | // new pointer is written to art |

In the example of FIG. 5, the WRF 508 stores the results of the execution units 514, and for this reason, the WRF 508 is equipped with eight write ports. In addition, eighteen read ports extend from the WRF 508 to the bypass matrix 512. Again, the number of ports (eighteen in this example) is dictated by the execution units. In the example here, two of the execution units are "store" units which require three operands to execute. The remaining six execution units are supplied with two operands each. The total operands applied to the pipeline, and thus total read ports from WRF 508 is $(2\times6)+(3\times2)=18$.

Thus, in the example of the 8-issue machine of FIG. 5, the number of ports equipped in the WRF 508 is as shown below in Table 2:

TABLE 2

| PORT TYPE | WRF 508 |
|---|---|
| READ (Execution) | 18 |
| WRITE (Execution) | 8 |
| READ (Retire) | (none) |
| WRITE (Retire) | (none) |
| TOTALS | 26 |

As is readily apparent from a comparison with Table 1 above, the present invention result in a substantial decrease in the number of ports equipped in connection with the storage and then retirement of speculative data. This greatly reduces the interconnects in the most dense area of the processor, and thus enables a higher frequency of operation.

As described above, the present invention presents an architecture in which the reorder buffer register file and the architectural register file of the conventional configuration are combined into a single working register file. The rest of the conventional configuration remains essentially unchanged. According to the invention, at the time of retire, a status bit associated with each working register file entry is changed and the ART is updated, thus avoiding data movement. This saves both read and write ports conventionally associated with retirement into the architectural register file.

Figure 1:
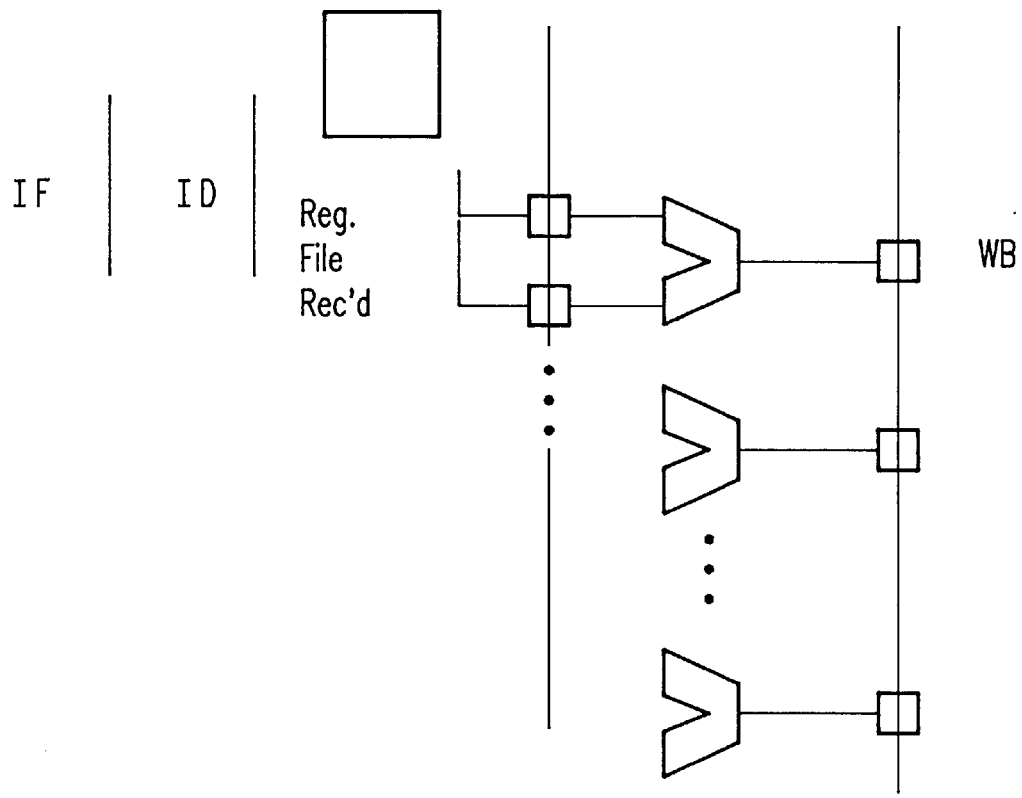
FIG. 1 is a diagram for explaining the general operation of a superscalar machine.
Figure 3:
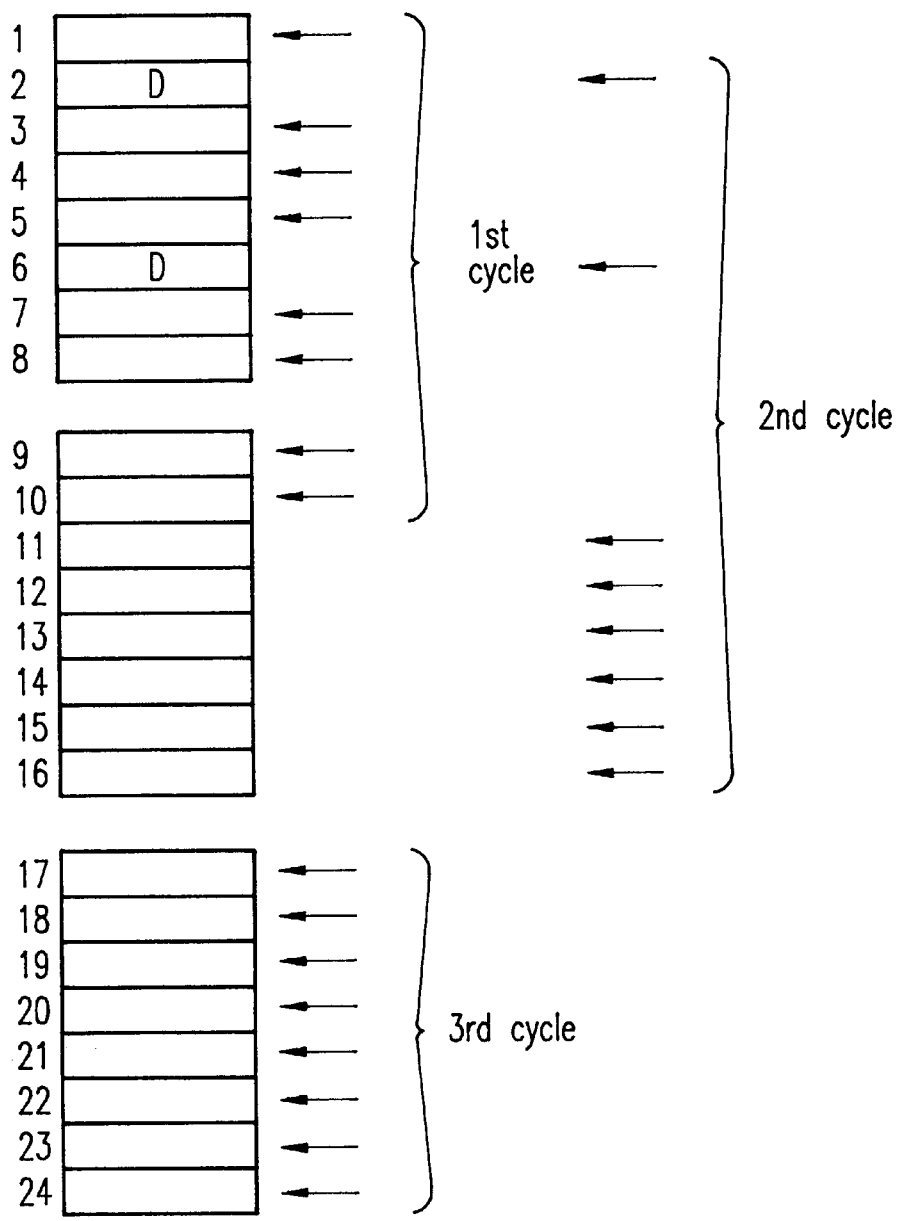
FIG. 3 is a diagram for generally explaining the operation of an "out-of-order" machine.
Figure 4:
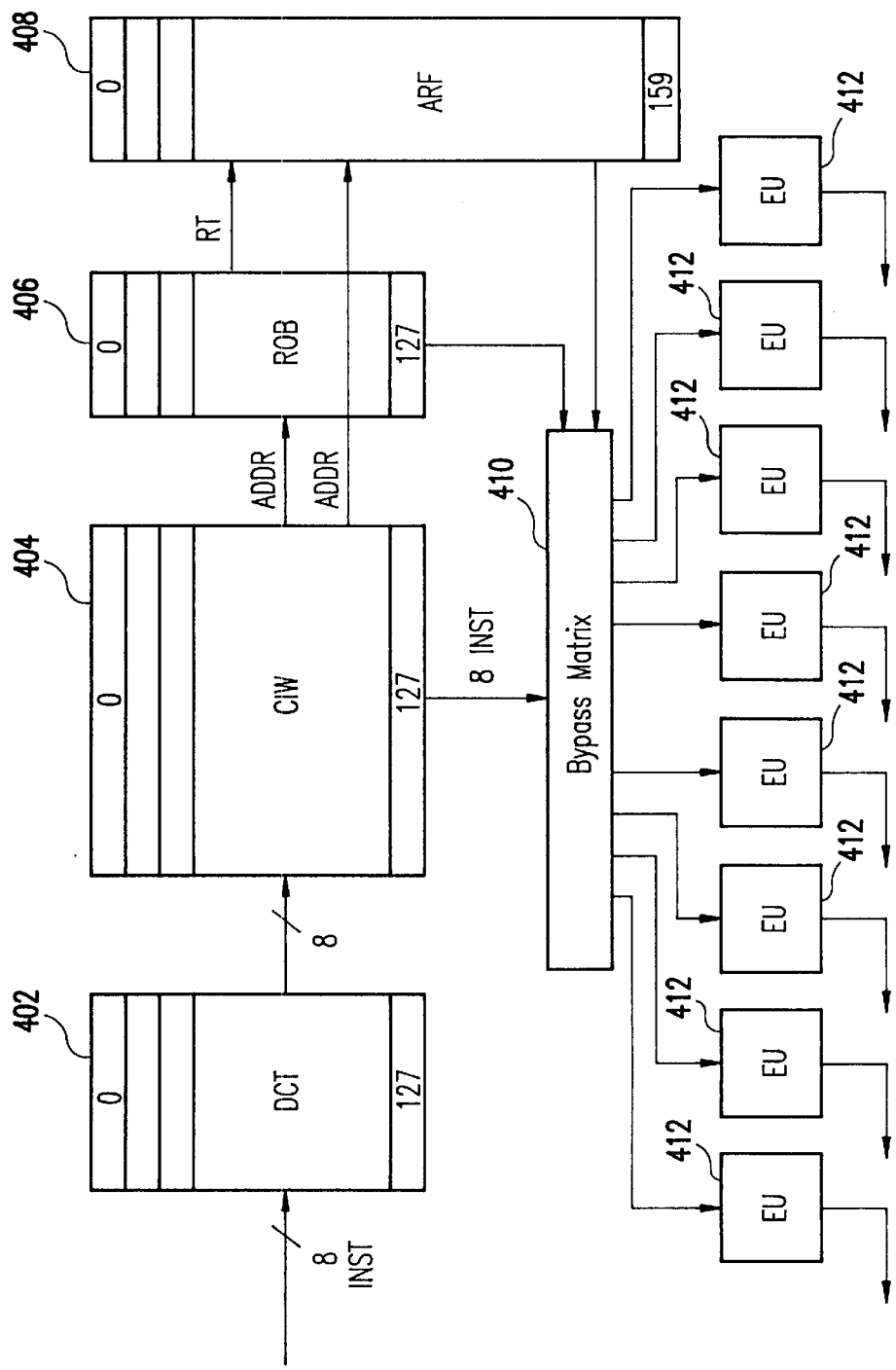
FIG. 4 shows a conventional machine architecture of an 8-issue processor having out-of-order execution.

It is also noted that the architectural register file of the invention is distributed across the working register file. The usage of a single combined register file and the lack of a one-to-one correspondence between the DCT, CIW entries and the rename space provides an additional advantage. That is, the conventional architecture of FIG. 4 includes 160 integer registers (architectural) and 128 registers (reorder) for renaming them, with a total of 288 registers. The embodiment of the present invention includes a single register that is 256 registers deep (160 architectural and 96 speculative). Less speculative registers are needed because some instructions like branches and stores (which can constitute 25% of the instruction mix) do not produce data. The new configuration of the present invention can exploit this advantage.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A superscalar processor, comprising:

execution units for executing multiple instructions in parallel to obtain multiple execution results;

a working register file for storing the multiple execution results, each execution result in the working register file having at least one status bit associated therewith which identifies the execution result as valid data; and means for retiring the multiple execution results contained in the working register file by changing the status bits associated with each execution result in the working register file to identify the execution result in the working register file as an architectural copy of data.

2. A superscalar processor as claimed in claim 1, further comprising a first table identifying an address within the working register file of each speculative data, and a second table identifying an address within the working register file of each architectural copy of data.

3. A superscalar processor as claimed in claim 2, further comprising;

a central instruction window for storing multiple instructions;

means for scanning the first table to identify and extract from the working register file any operands of the multiple instructions which are stored as speculative data in the working register file;

means for scanning the second table to identify and extract from the working register file any remaining operands of the multiple instructions which are not stored as speculative data in the working register file.

4. In a superscalar processor which executes processor instructions out-of-order such that an execution result is first stored as speculative data prior to being retired to destination addresses as an architectural copy of data, the improvement comprising storing both the speculative data and the architectural copy of the data in a same working register file, and retiring the speculative data by changing status bits in the working register file, wherein the speculative data is retired as the architectural copy of the data without data movement of the speculative data.

* * * * *